US012634467B2

(12) United States Patent
Choi et al.

(10) Patent No.: US 12,634,467 B2
(45) Date of Patent: May 19, 2026

(54) METHOD AND APPARATUS FOR VIDEO CODING DEVICE USING CANDIDATE LIST OF MOTION VECTOR PREDICTORS

(71) Applicants: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Han Sol Choi, Dongducheon-si (KR); Myung Oh Hong, Gwangmyeong-si (KR); Dong Gyu Sim, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/737,241

(22) Filed: Jun. 7, 2024

(65) Prior Publication Data

US 2024/0333938 A1     Oct. 3, 2024

Related U.S. Application Data

(63) Continuation of application No. PCT/KR2022/016350, filed on Oct. 25, 2022.

(30) Foreign Application Priority Data

Dec. 15, 2021    (KR) ........................ 10-2021-0180062
Oct. 24, 2022    (KR) ........................ 10-2022-0137794

(51) Int. Cl.
H04N 19/105     (2014.01)
H04N 19/137     (2014.01)
H04N 19/176     (2014.01)

(52) U.S. Cl.
CPC ......... *H04N 19/137* (2014.11); *H04N 19/105* (2014.11); *H04N 19/176* (2014.11)

(58) Field of Classification Search
CPC ... H04N 19/137; H04N 19/105; H04N 19/176
(Continued)

(56) References Cited

U.S. PATENT DOCUMENTS 6,671,321 B1    12/2003  Ohtani
11,336,914 B2    5/2022  Chien
(Continued)

FOREIGN PATENT DOCUMENTS

JP          2001145114 A     5/2001
KR         20210036411 A     4/2021
(Continued)

OTHER PUBLICATIONS

International Search Report and Written Opinion cited in corresponding international patent application No. PCT/KR2022/016350; Feb. 16, 2023; 9 pp.

*Primary Examiner* — Albert Kir
(74) *Attorney, Agent, or Firm* — Lempia Summerfield Katz LLC

(57) ABSTRACT

A method and an apparatus are disclosed for video coding using a candidate list of motion vector predictors. The video coding method and the apparatus compose a candidate list that further includes object corresponding position candidates and large motion candidates. The video coding method and the apparatus reconstruct a motion vector of the current block based on the candidate list.

12 Claims, 16 Drawing Sheets

(58) Field of Classification Search

USPC .................................................. 375/240.02

See application file for complete search history.

(56) References Cited

U.S. PATENT DOCUMENTS

| | | | | |
|---|---|---|---|---|
| 11,516,464 | B2 | 11/2022 | Chen | |
| 11,877,010 | B2 | 1/2024 | Jang | |
| 11,889,061 | B2 | 1/2024 | Chen | |
| 2008/0080617 | A1* | 4/2008 | Kodama | H04N 19/56 |
| | | | | 375/E7.125 |
| 2012/0294372 | A1* | 11/2012 | Kitahara | H04N 19/56 |
| | | | | 375/E7.125 |
| 2013/0101041 | A1* | 4/2013 | Fishwick | H04N 19/61 |
| | | | | 375/240.16 |
| 2014/0037011 | A1* | 2/2014 | Lim | H04N 19/103 |
| | | | | 375/240.16 |
| 2020/0059658 | A1 | 2/2020 | Chien | |
| 2020/0068218 | A1* | 2/2020 | Chen | H04N 19/82 |
| 2021/0176462 | A1 | 6/2021 | Chen | |
| 2022/0109883 | A1 | 4/2022 | Jang | |
| 2022/0124321 | A1* | 4/2022 | Zeng | H04N 19/14 |
| 2023/0051412 | A1 | 2/2023 | Da Silva Pratas Gabriel et al. | |
| 2023/0121428 | A1 | 4/2023 | Chen | |
| 2023/0412817 | A1* | 12/2023 | Yu | H04N 19/46 |
| 2024/0107074 | A1 | 3/2024 | Jang | |
| 2025/0227313 | A1* | 7/2025 | Jang | H04N 19/88 |

FOREIGN PATENT DOCUMENTS

| | | | |
|---|---|---|---|
| KR | 20210042103 A | 4/2021 | |
| KR | 20210143325 A | 11/2021 | |
| WO | 2021130357 A1 | 7/2021 | |

* cited by examiner

0 : Planar
1 : DC

Final Prediction Block

<u>610</u>

Candidate List Composer — 710

MVP Deriver — 720

MVP Scaler — 730

MVD Deriver — 740

MVD Inverse Scaler — 750

Motion Vector Reconstructor — 760

Reference Picture

Current Picture

Reference Picture

Current Picture

Current Picture

Current Picture

METHOD AND APPARATUS FOR VIDEO CODING DEVICE USING CANDIDATE LIST OF MOTION VECTOR PREDICTORS

CROSS-REFERENCE TO RELATED APPLICATIONS

This application is a continuation of International Application No. PCT/KR2022/016350 filed on Oct. 25, 2022, which claims priority to and the benefit of Korean Patent Application No. 10-2021-0180062, filed on Dec. 15, 2021, and Korean Patent Application No. 10-2022-0137794, filed on Oct. 24, 2022, the entire contents of each of which are incorporated herein by reference.

TECHNICAL FIELD

The present disclosure relates to a video coding method and an apparatus using a candidate list of motion vector predictors.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/AVC, High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required.

In inter prediction of the VVC technique, the encoding device or decoding device derives a motion vector and then uses the derived motion vector to generate a prediction block of the current block. When the motion vector is encoded according to a merge mode or merge skip mode, the encoding device or decoding device may derive a motion vector predictor (MVP) from a candidate list and may use the MVP as the motion vector of the current block. Alternatively, the encoding device or decoding device may derive a motion vector difference (MVD) by using a Merge mode with Motion Vector Difference (MMVD) technique, and then may add the MVD and MVP to reconstruct the motion vector. Alternatively, when the motion vector is encoded according to an advanced motion vector prediction (AMVP) mode, the encoding device or decoding device may derive an MVP from a candidate list and then may add the MVP and the signaled MVD to reconstruct the motion vector.

In a unidirectional prediction, the reconstructed motion vector may be used to generate a single prediction block. In a bidirectional prediction, the reconstructed motion vectors may be used to generate two prediction blocks. Then, by weight-summing the two prediction blocks, a final prediction block may be generated.

As described above, the composition of a candidate list composed of MVPs as candidates is critical to the performance of inter prediction. Therefore, to improve video coding efficiency and enhance video quality, a method of effectively composing a candidate list needs to be provided.

SUMMARY

The present disclosure seeks to provide a video coding method and an apparatus for organizing or composing a candidate list that further includes object corresponding position candidates and large motion candidates to improve video coding efficiency and enhance video quality. The video coding method and the apparatus reconstruct a motion vector of a current block based on the candidate list.

At least one aspect of the present disclosure provides a method of decoding a motion vector of a current block by a video decoding device. The method includes decoding, from a bitstream, a candidate index of a motion vector predictor of the current block. Here, the candidate index indicates one of motion vector predictors in a candidate list that includes all or one or more of spatial candidates, temporal candidates, history-based candidates, object corresponding position candidates, or large motion candidates. The method also includes composing the candidate list and deriving the motion vector predictor of the current block from the candidate list by using the candidate index.

Another aspect of the present disclosure provides a method of encoding a motion vector of a current block by a video encoding device. The method includes composing a candidate list of motion vector predictor candidates of a motion vector predictor of the current block. The method also includes determining a candidate index of the motion vector predictor of the current block. Here, the candidate index indicates one of the motion vector predictor candidates in the candidate list that includes all or one or more of spatial candidates, temporal candidates, history-based candidates, object corresponding position candidates, or large motion candidates. The method also includes deriving the motion vector predictor of the current block from the candidate list by using the candidate index.

Yet another aspect of the present disclosure provides a computer-readable recording medium storing a bitstream generated by a video encoding method for encoding a motion vector of a current block. The video encoding method includes composing a candidate list of motion vector predictor candidates of a motion vector predictor of the current block. The video encoding method also includes determining a candidate index of the motion vector predictor of the current block. Here, the candidate index indicates one of the motion vector predictor candidates in the candidate list that includes all or one or more of spatial candidates, temporal candidates, history-based candidates, object corresponding position candidates, or large motion candidates. The video encoding method also includes deriving the motion vector predictor of the current block from the candidate list by using the candidate index.

As described above, the present disclosure provides a video coding method and an apparatus for composing a candidate list that further includes object corresponding position candidates and large motion candidates. The video coding method and the apparatus reconstruct a motion vector of the current block based on the candidate list. Thus, the video coding method and the apparatus improve video coding efficiency and enhance video quality.

DETAILED DESCRIPTION

Figure 1:
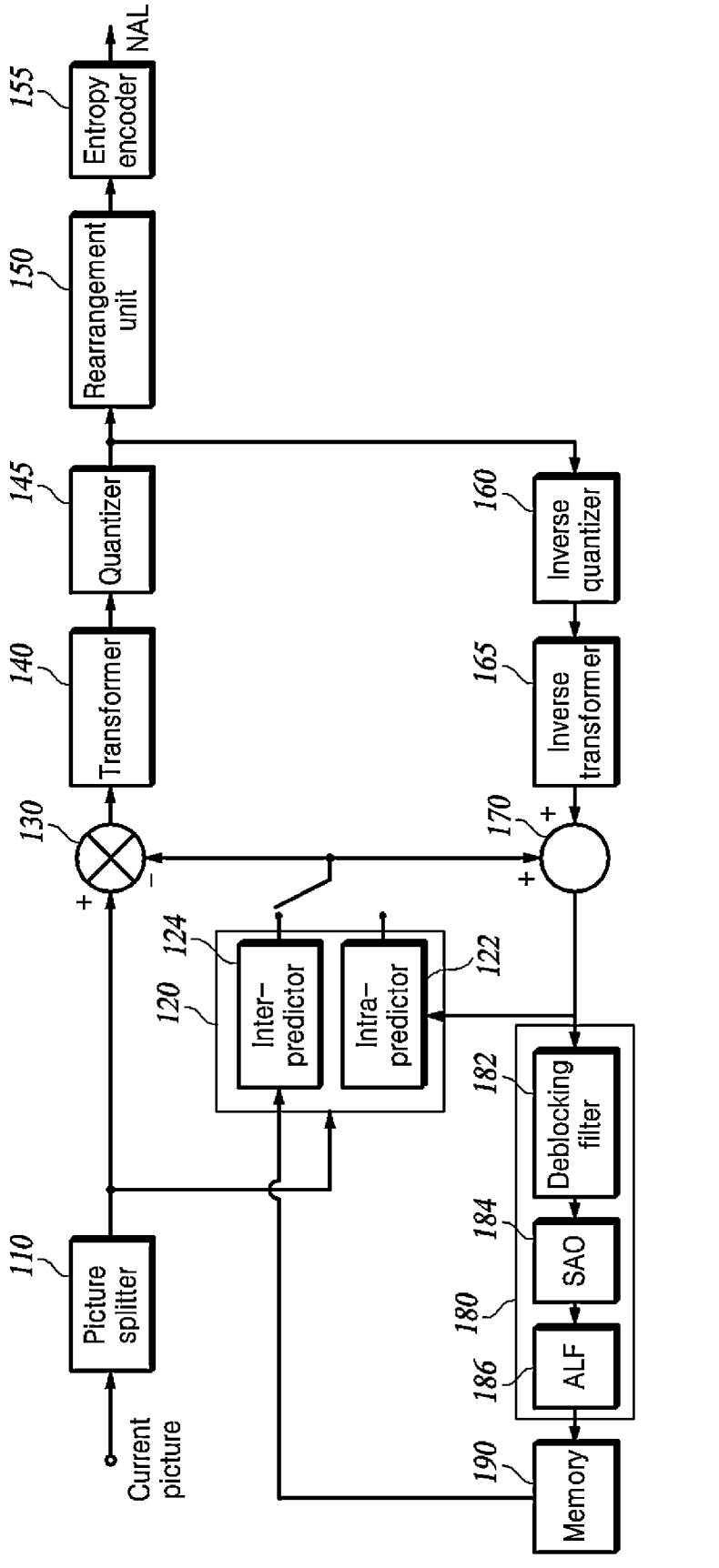
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
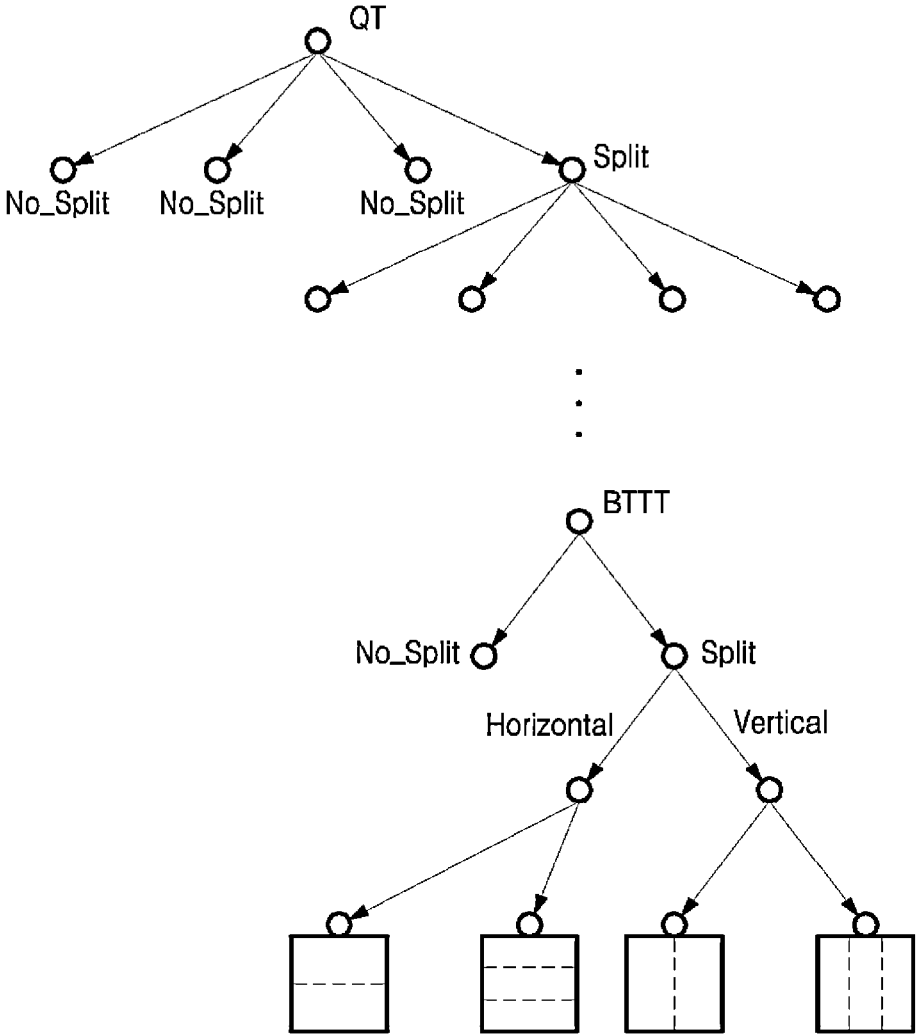
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
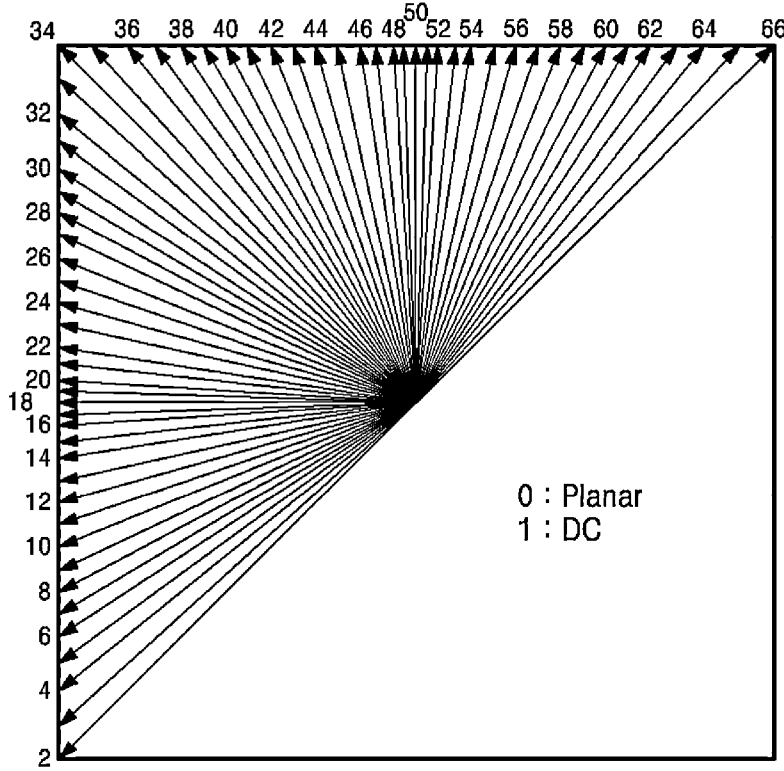
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
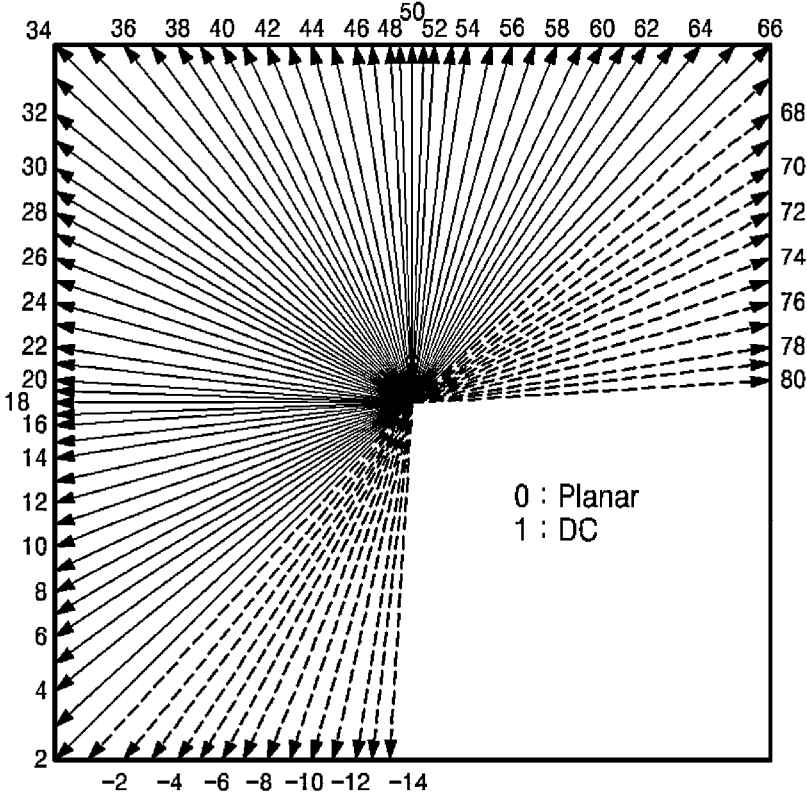

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than-135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
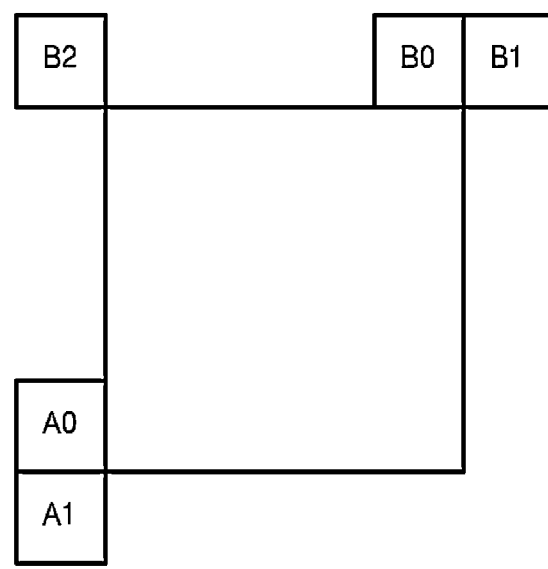
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
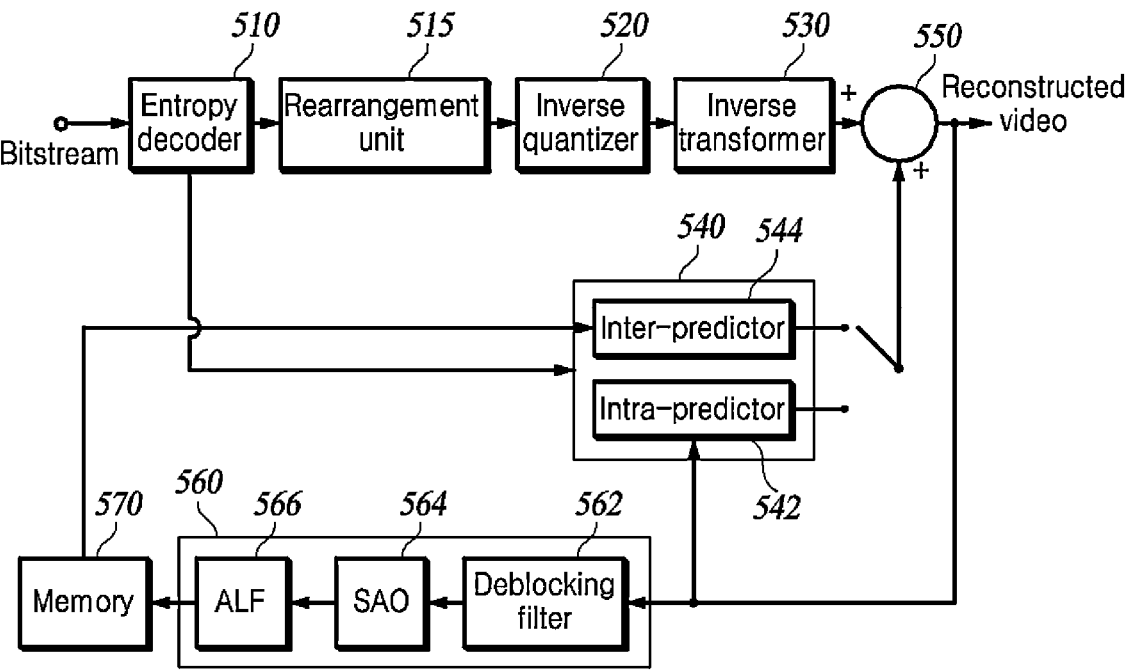
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus for composing a candidate list including object corresponding position candidates and a large motion candidate. The video coding method and the apparatus reconstruct a motion vector of the current block based on the candidate list.

The following embodiments may be performed by the inter predictor 124 in the video encoding device. The following embodiments may also be performed by the inter predictor 544 in the video decoding device.

The video encoding device when encoding the current block may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with decoding the current block.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Inter Prediction's Merge/Skip Mode and MMVD

The following embodiments are described with reference to the inter predictor 124 in the video encoding device but may also be performed by the inter predictor 544 in the video decoding device as described above.

The following describes a method of composing a list of merge candidates of motion information in a merge/skip mode of inter prediction. To support the merge/skip mode, the inter predictor 124 in the video encoding device may select a preset number of (e.g., six) merge candidates to form the merge candidate list.

The inter predictor 124 searches for spatial merge candidates. The inter predictor 124 searches for the spatial merge candidates from neighboring blocks, as illustrated in FIG. 4. Up to four spatial merge candidates may be selected.

The inter predictor 124 searches for a temporal merge candidate. The inter predictor 124 may add as the temporal merge candidate such a blocks that is co-located with the current block and is within a reference picture, which may or may not be the same as the reference picture used to predict the current block, other than the current picture that contains the target block. One temporal merge candidate may be selected.

The inter predictor 124 searches for history-based motion vector predictor (HMVP) candidates. The inter predictor 124 may store in a table the motion vectors of the previous h CUs (where h is a natural number) and may utilize the stored motion vectors of the previous CUs as merge candidates. The table has a size of 6 and stores the motion vectors of the previous CUs in a first-in-first-out (FIFO) fashion. This indicates that up to six HMVP candidates are stored in the table. The inter predictor 124 may set the most recent motion vectors among the HMVP candidates stored in the table as the merge candidates.

The inter predictor 124 searches for Pairwise Average MVP (PAMVP) candidates. The inter predictor 124 may set the average of the motion vectors of the first candidate and the second candidate in the merge candidate list as the merge candidate.

When the merge candidate list cannot be populated (i.e., the preset number of candidates is not fulfilled) after performing all of the aforementioned searching operations, the inter predictor 124 adds a zero motion vector as a merge candidate.

In terms of optimizing coding efficiency, the inter predictor 124 may determine a merge index that indicates one candidate within the merge candidate list. The inter predictor 124 may use the merge index to derive a motion vector predictor (MVP) from the merge candidate list and then may determine the MVP as the motion vector for the current block. Further, the video encoding device may signal the merge index to the video decoding device.

The video encoding device, in the skip mode, utilizes the same method of transmitting the motion vector as in the merge mode but does not transmit a residual block corresponding to the difference between the current block and the prediction block.

The afore-described method of composing the merge candidate list may be equally performed in the video decoding device by the inter predictor 544. The video decoding device may decode the merge index. The inter predictor 544 may use the merge index to derive the MVP from the merge candidate list and then may determine the MVP as the motion vector of the current block.

On the other hand, when utilizing the Merge mode with Motion Vector Difference (MMVD) technique, the inter predictor 124 may use the merge index to derive the MVP from the merge candidate list. For example, the first or second candidate in the merge candidate list may be used as the MVP. Further, in terms of optimizing coding efficiency, the inter predictor 124 determines a distance index and a direction index. The inter predictor 124 may use the distance index and the direction index to derive a motion vector difference (MVD) and then may add the MVD and the MVP to reconstruct the motion vector of the current block. Furthermore, the video encoding device may signal the merge index, the distance index, and the direction index to the video decoding device.

The MMVD technique described above may be equally performed in the video decoding device by the inter predictor 544. The video decoding device may decode the merge index, the distance index, and the direction index. After composing the merge candidate list, the inter predictor 544 may use the merge index to derive an MVP from the merge candidate list. After deriving the MVD by using the distance index and the direction index, the inter predictor 544 may add the MVD and the MVP to reconstruct the motion vector of the current block.

II. Inter Prediction's AMVP Mode and AMVR

The following embodiments are described with reference to the inter predictor 124 in the video encoding device but may also be performed by the inter predictor 544 in the video decoding device as described above.

The following describes a method of composing a candidate list of motion information in an Advanced Motion Vector Prediction (AMVP) mode of inter prediction. To support the AMVP mode, the inter predictor 124 in the video encoding device may select a preset number of (e.g., two) candidates to form the candidate list.

The inter predictor 124 searches for spatial candidates. The inter predictor 124 searches for the spatial candidates from neighboring blocks, as illustrated in FIG. 4. Up to two spatial candidates may be selected.

The inter predictor 124 searches for a temporal candidate. The inter predictor 124 may add as the temporal candidate such a block that is co-located with the current block and is within a reference picture, which may or may not be the same as the reference picture used to predict the current block, other than the current picture that contains the target block. One temporal candidate may be selected.

When the merge candidate list cannot be populated (i.e., the preset number of candidates is not fulfilled) after performing all of the aforementioned searching operations, the inter predictor 124 adds a zero motion vector as a candidate.

In terms of optimizing coding efficiency, the inter predictor 124 may determine a candidate index that indicates one candidate in the candidate list. The inter predictor 124 may use the candidate index to derive an MVP from the candidate list. Further, in terms of optimizing the coding efficiency, the inter predictor 124 determines the motion vector and then subtracts the MVP from the motion vector to calculate the MVD (motion vector difference). Further, the video encoding device may signal the candidate index and the MVD to the video decoding device.

The above-described method of composing the AMVP candidate list may be equally performed in the video decoding device by the inter predictor 544. The video decoding device may decode the candidate index and MVD. The inter predictor 544 may use the candidate index to derive an MVP from the candidate list. The inter prediction unit 544 may add the MVD and MVP to reconstruct the motion vector of the current block.

Meanwhile, the video encoding device transmits information that determines the spatial resolution of the MVD along with the MVD. When using the AMVR (adaptive motion vector resolution) techniques, the video encoding device may determine an adaptive spatial resolution of the MVD in terms of optimizing rate distortion. In this case, the spatial resolution of the MVD may be the same as that of the motion vector.

When using the AMVR techniques, the video encoding device signals amvr_flag and amvr_precision_idx to the video decoding device to inform the same of the spatial resolution of the MVD. If amvr_flag is signaled as 0, the video decoding device sets the MVD to ¼-pel spatial resolution. On the other hand, if amvr_flag is not zero, the video decoding device may determine the spatial resolution of the MVD based on amvr_precision_idx. At this time, the selectable spatial resolution of the MVD may vary depending on the prediction method applied with AMVR. The prediction methods to which AMVR can be applied include general AMVP mode, affine AMVP mode, intra block copy (IBC) AMVP mode, and the like.

III. Candidate List Composition According to Embodiments

The following embodiments are described centering on the inter predictor 124 in the video encoding device but may also be performed by the inter predictor 544 in the video decoding device as described above.

Figure 6:
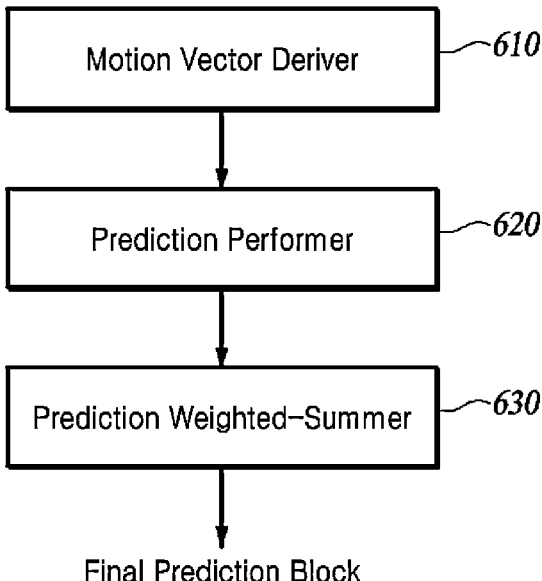
FIG. 6 is a block diagram illustrating an inter prediction unit according to at least one embodiment of the present disclosure.

FIG. 6 is a block diagram illustrating an inter prediction unit according to at least one embodiment of the present disclosure.

The inter predictor 124 may include all or one or more of a motion vector deriver 610, a prediction performer 620, or a prediction weighted-summer 630.

The motion vector deriver 610 derives at least one or more motion vectors according to the merge/skip mode, MMVD, or AMVP mode. Regardless of which motion vector derivation method is utilized, the motion vector deriver 610 composes a candidate list for deriving the MVP.

The prediction performer 620 uses the motion vector to derive a prediction block of the current block. When performing a bidirectional prediction, the motion vectors may be used to generate two prediction blocks.

The prediction weighted-summer 630 may use methods, such as weighted prediction, average prediction, geometric partitioning mode (GPM), and the like for weighted summing the two prediction blocks to generate a final prediction block.

Figure 7:
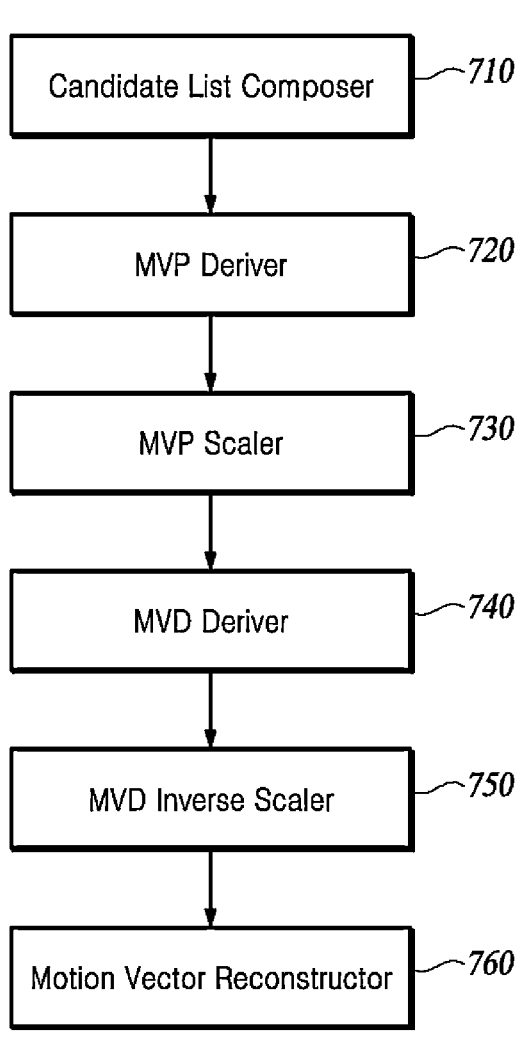
FIG. 7 is a block diagram illustrating a motion vector deriver according to at least one embodiment of the present disclosure.

FIG. 7 is a block diagram illustrating a motion vector deriver according to at least one embodiment of the present disclosure.

The motion vector deriver 610 according to this embodiment includes all or one or more of a candidate list composer 710, an MVP deriver 720, an MVP scaler 730, an MVD deriver 740, an MVD inverse scaler 750, or a motion vector reconstructor 760.

The candidate list composer 710 composes a candidate list according to the present embodiment. Further details for composing the candidate list are described below.

The MVP deriver 720 derives an MVP (motion vector predictor) from the candidate list by using a candidate index. The candidate index may be determined by the video encoding device, as described above, and then transmitted to the video decoding device.

The MVP scaler 730 applies scaling to the MVP, for example, if the reference picture of the current picture is different from the reference picture of the candidate (i.e., MVP).

The MVD deriver 740 derives the MVD (motion vector difference). As in AMVP mode, the MVD may be determined by the video encoding device and then signaled to the video decoding device. Alternatively, as in MMVD techniques, information for deriving the MVD may be determined by the video encoding device and signaled to the video decoding device.

The MVD inverse scaler 750 may apply inverse scaling to the MVD, for example, when adaptive motion vector resolution (AMVR) is applied.

The motion vector reconstructor 760 adds up the MVP and the MVD to reconstruct the motion vector. When performing a uni-directional prediction, one motion vector may be generated, and with a bi-directional prediction, two motion vectors may be generated.

The following describes how the candidate list composer 710, according to this embodiment, composes a candidate list.

The candidate list composer 710 searches for MVP candidates to compose the candidate list. Here, the MVP candidates may include all or one or more of spatial candidates, temporal candidates, history-based candidates, object corresponding position candidates, or large motion candidates.

Figure 8:
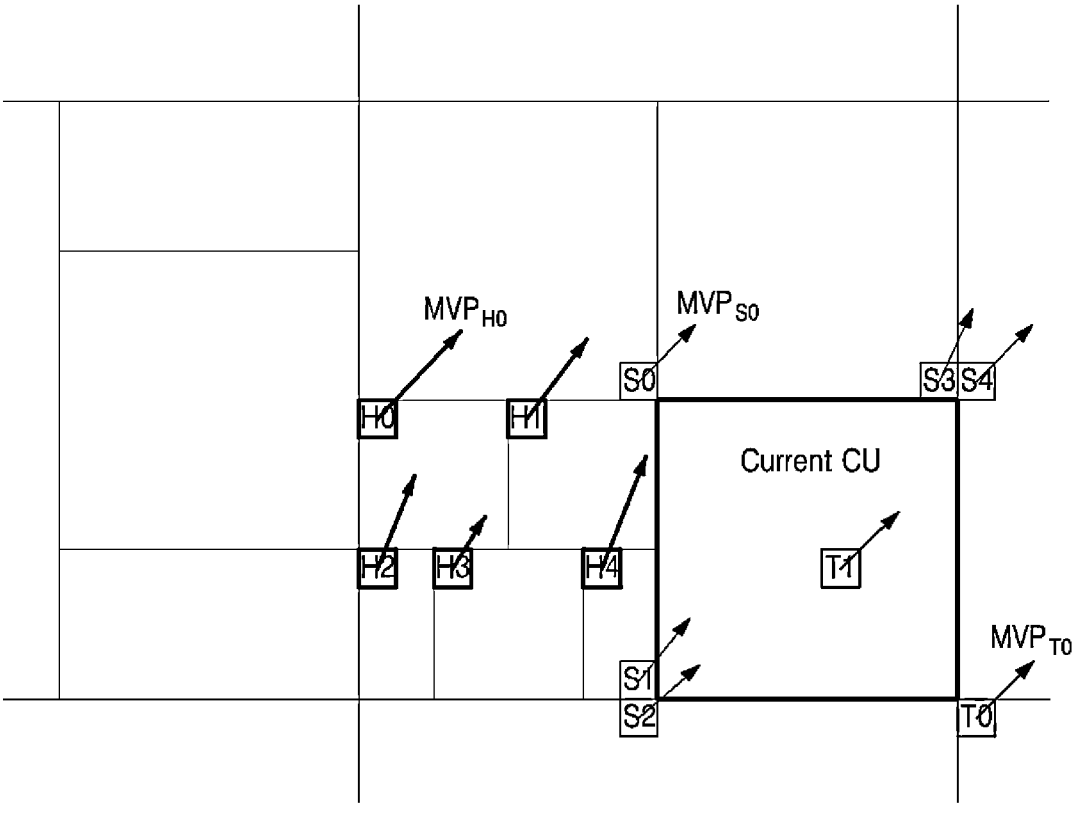
FIG. 8 is a diagram illustrating spatial candidates, temporal candidates, and history-based candidates, according to at least one embodiment of the present disclosure.

FIG. 8 is a diagram illustrating the spatial candidates, temporal candidates, and history-based candidates, according to at least one embodiment of the present disclosure.

The candidate list composer 710 searches for spatial candidates within the same frame as the current block is in. The spatial candidates may be motion vectors of blocks containing reconstructed pixels that are spatially adjacent to the current block. Here, the reconstructed pixels may be pixels that are adjacent to the top left, top right, or bottom right pixels of the current block, as illustrated in FIG. 8. The candidate list composer 710 may store at least one or more spatial candidates in the candidate list and may search for the available spatial candidates for use in a preset order to store up to $N_s$ candidates in the candidate list. The preset order may be, for example, the following order of occurrences: pixel at a position −a in the x-axis and y-axis from the top left pixel of the current block, a pixel at a position −a in the x-axis or position +b in the y-axis from the bottom-left pixel of the current block, and a pixel at a position +a in the x-axis or a position −b in the y-axis from the top-right pixel of the current block. Here, as in the example of FIG. 4, 'a' may be 0 or 1, and 'b' may be 0 or 1.

The candidate list composer 710 searches for temporal candidates within the reference picture of the current block. The temporal candidates may be motion vectors of blocks that include reconstructed pixels and are within or adjacent to the same area as the current block is in. The reconstructed pixel may be a pixel at a center position within the same area as the current block is in, as illustrated in FIG. 8, or a pixel at a position +1 along the x-axis and y-axis from the bottom right pixel of the same area as the current block is in. The candidate list composer 710 may store at least one or more temporal candidates in the candidate list, and may search for the available temporal candidates for use in a preset order to store up to $N_t$ candidates in the candidate list.

The candidate list composer 710 searches for history-based candidates from CUs decoded earlier than the current block. The history-based candidates may be motion vectors of CUs that were decoded earlier than the current block. The candidate list composer 710 may retrieve history-based candidates beginning with recently decoded CUs and may store up to NH candidates in the candidate list.

The candidate list composer 710 searches for object corresponding position candidates from the objects in the reference picture of the current block. The object corresponding position candidates may be a vector representing the difference between any pixel in the area having the same object index as the object index of the current block and the top left pixel of the current block. The following describes how the candidate list composer 710 derives object corresponding position candidates by using the illustration of FIG. 9.

Figure 9:
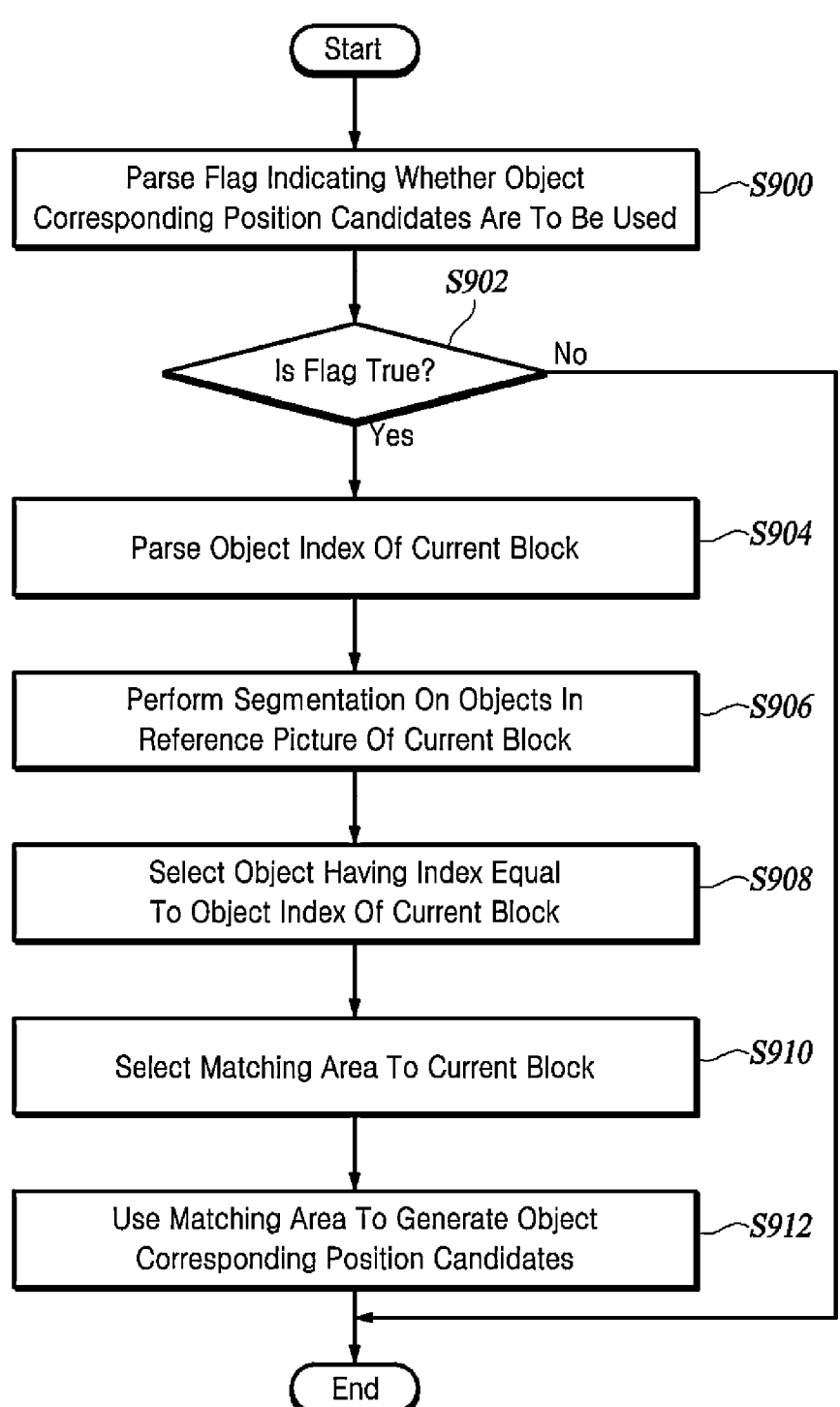
FIG. 9 is a flowchart of a method of deriving object corresponding position candidates, according to at least one embodiment of the present disclosure.

FIG. 9 is a flowchart of a method of deriving object corresponding position candidates, according to at least one embodiment of the present disclosure.

The candidate list composer 710 parses a flag of slice_objcorr_mvp_enabled_flag indicating whether the slice (or tile) containing the current block uses object corresponding position candidates (S900). In terms of optimizing coding efficiency, the video encoding device may determine this flag and signal the flag to the video decoding device.

The candidate list composer 710 checks whether the flag is true (S902).

If the parsed flag is true and the slice uses the object corresponding position candidate (Yes in S902), the candidate list composer 710 may include the object corresponding position candidate in the candidate list for the current block, as follows.

The candidate list composer 710 parses the object index of the current block (S904). Here, the object index of obj_idx may be an index of an object that contains the current block. Objects may be as many as $N_{object}$ defined for a picture group. In terms of optimizing coding efficiency, the video encoding device may determine the object index of the current block and signal the object index to the video decoding device.

In another embodiment, the candidate list composer 710 may assign, as the object index of the current block, an index of an object that covers the area of the current block among objects of a large motion object list of large_motion_object_list parsed at the picture level. The large motion object list includes at least one or more large motion objects, wherein the information on each large motion object includes an object index and the top left coordinate of the object bounding box.

In the object index of the large motion object list and the object list of the picture group, the same index may represent the same object. By comparing the large motion object list of the reference picture to the large motion object list of the current picture, the candidate list composer 710 may determine if an object equal to the object index of the current block exists in the reference picture, and if yes, the candidate list composer 710 may perform steps of deriving the subsequent object corresponding position candidate.

The candidate list composer 710 performs segmentation on the objects in the reference picture of the current block (S906). The candidate list composer 710 may pre-parse a reference picture index that indicates the reference picture.

Figure 10:
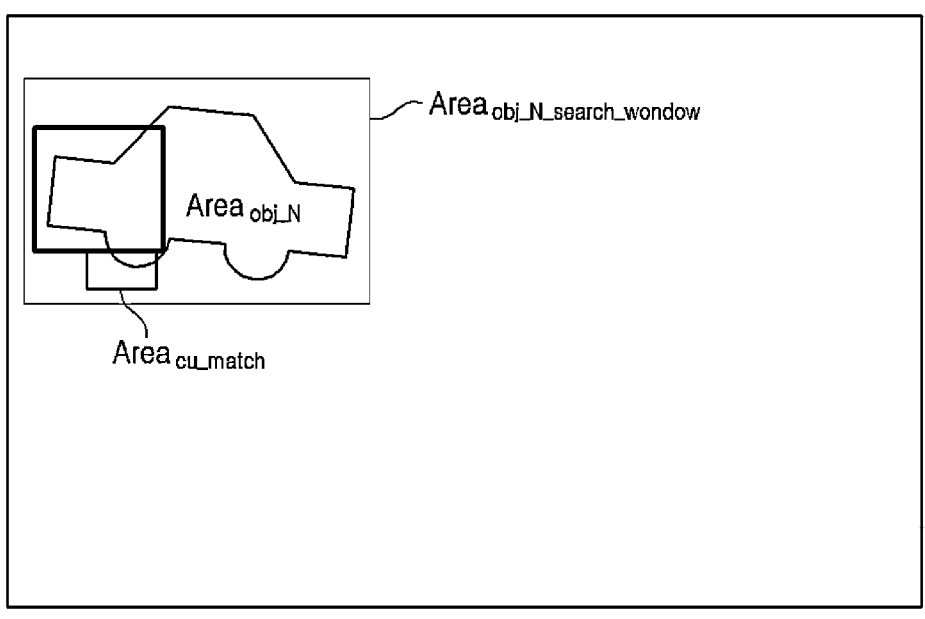
FIG. 10 is a diagram illustrating the selection of a matching area that matches the current block, according to at least one embodiment of the present disclosure.
Figure 10:
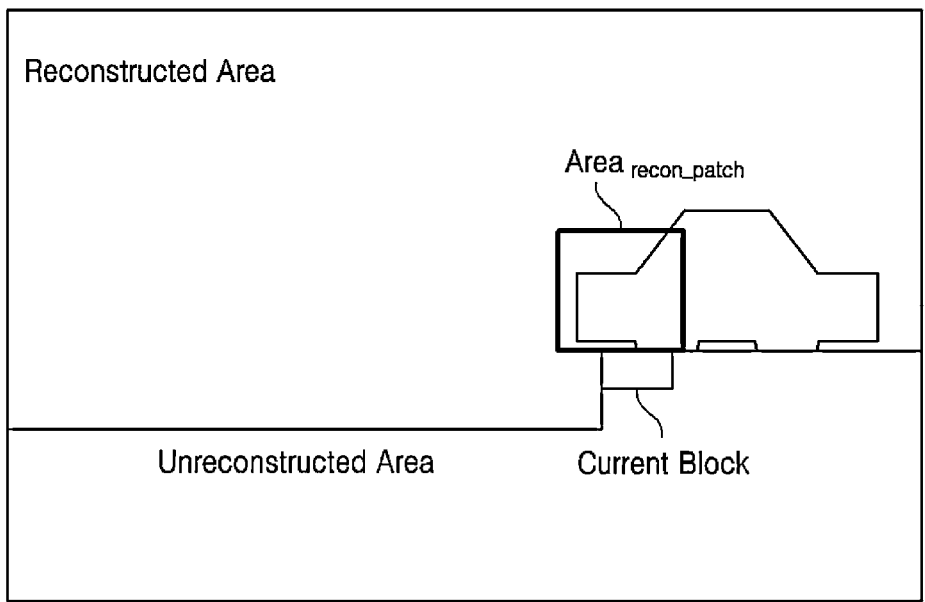

The candidate list composer 710 selects from the segmented objects an object with an equal index as the object index of the current block (S908). As shown in the example of FIG. 10, the area of the object with the same index is denoted by $Area_{obj\_N}$.

The candidate list composer 710 selects a matching area that matches the current block by using the search area containing the object with the same index (S910).

In the reference picture, denoted by $Area_{obj\_N\_search\_wondow}$ is the search area containing the area $Area_{obj\_N}$ of the object with the same index. The candidate list composer 710 searches in the $Area_{obj\_N\_search\_wondow}$ for an area that has a minimum difference in average pixel value from the reconstructed area $Area_{recon\_patch}$ neighboring the current block. The candidate list composer 710 may select a matching area of $Area_{cu\_match}$ that matches the current block in the reference picture based on the minimum-difference area, as shown in the example of FIG. 10. At this time, in the aspect of motion detection of the video encoding device, the position of the zero motion vector relative to the current block may be the top-left pixel of the $Area_{cu\_match}$. On the other hand, to search for the minimum-difference area, other methods of calculating the difference may be utilized in addition to the aforementioned difference in average pixel value.

As another embodiment, when the object containing the current block is derived by parsing the large motion object list, the matching area may be derived as follows.

Figure 11:
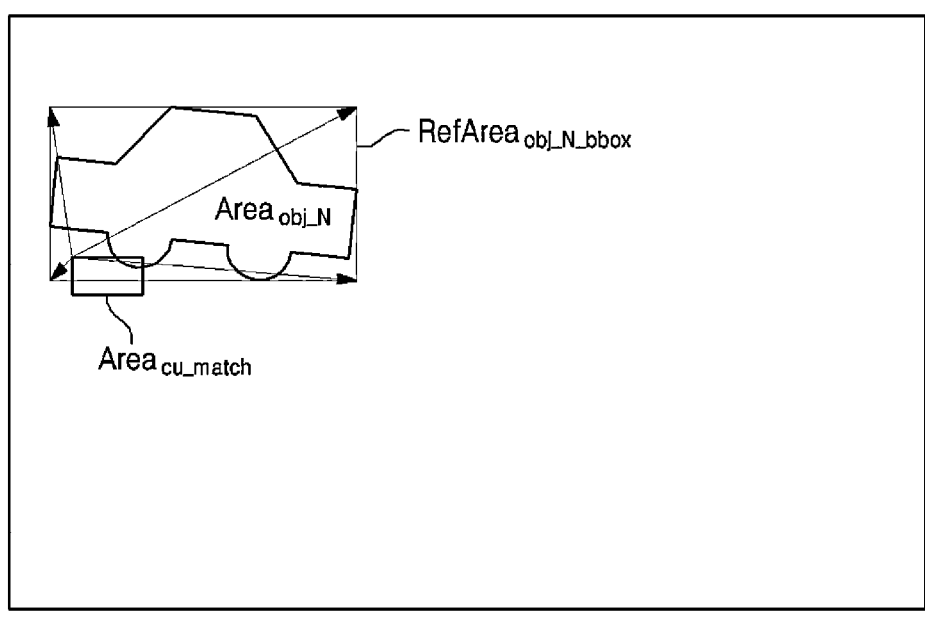
FIG. 11 is a diagram illustrating the selection of a matching area that matches the current block, according to another embodiment of the present disclosure.
Figure 11:
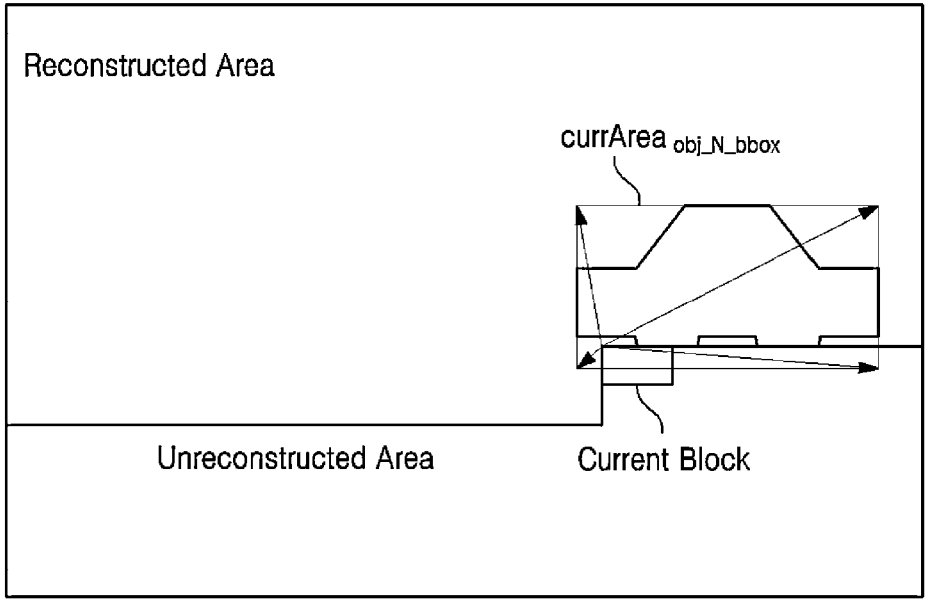

Using $CurrArea_{obj\_N\_bbox}$, an area of the object containing the current block in the current picture and $RefArea_{obj\_N\_bbox}$, an area in the reference picture, the candidate list composer 710 may select $Area_{cu\_match}$, the matching area that matches the current block in the reference picture. The CurrArea$_{obj\_N\_bobx}$ may be a bounding box area of an object in the large motion object list, whose area overlaps with the current block. The RefArea$_{obj\_N\_bbox}$ may be a bounding box area that contains the same object area in the reference picture of the current block. The object area may be derived by segmenting the reference picture or may be derived from the large motion object list of the reference picture. As illustrated in FIG. 11, the candidate list composer 710 may derive the location of the Area$_{cu\_match}$ area such that the relative location of the top left pixel of the current block within the CurrArea$_{obj\_N\_box}$ area is similar to the relative location of the matching area of Area$_{cu\_match}$ within the RefArea$_{obj\_N\_bbox}$ area.

The candidate list composer 710 uses the matching area to generate object corresponding position candidates (S912).

Figure 12:
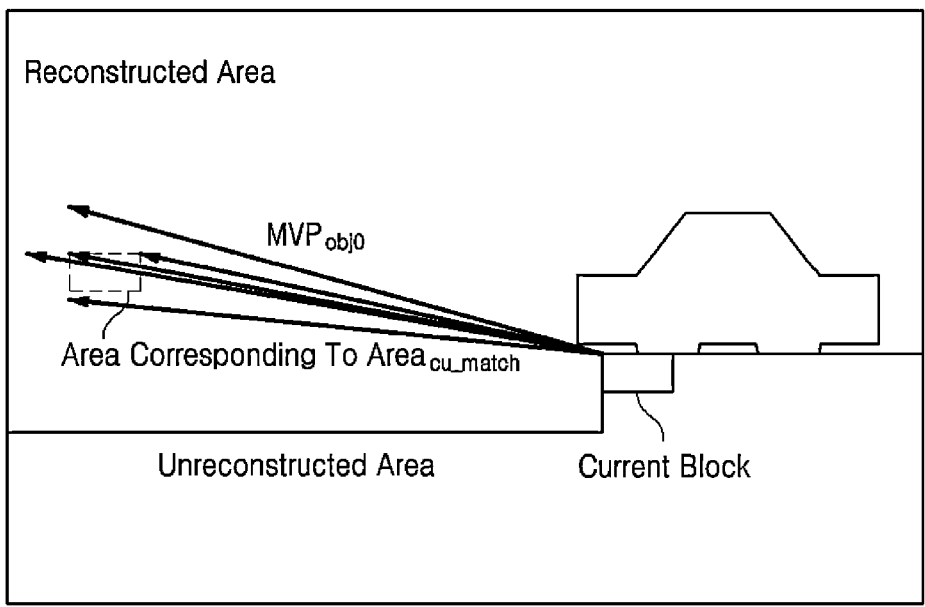
FIG. 12 is a diagram illustrating the derivation of object corresponding position candidates, according to at least one embodiment of the present disclosure.

As illustrated in FIG. 12, the object corresponding position candidate may be a vector with the top left pixel of the matching area Area$_{cu\_match}$ or neighboring pixels of the top-left pixel designated as an endpoint and the top left pixel of the current block designated as a starting point. In this case, the neighboring pixels may be pixels located at ±c in the x-axis or ±d in the y-axis relative to the top left pixel of the matching area. Here, 'c' and 'd' may be integers greater than or equal to 1. The candidate list composer 710 may store up to No candidates in the candidate list by sequentially searching over the neighboring pixels in a preset order beginning with the top left pixel of the matching area to derive the object corresponding position candidates.

Figure 13:
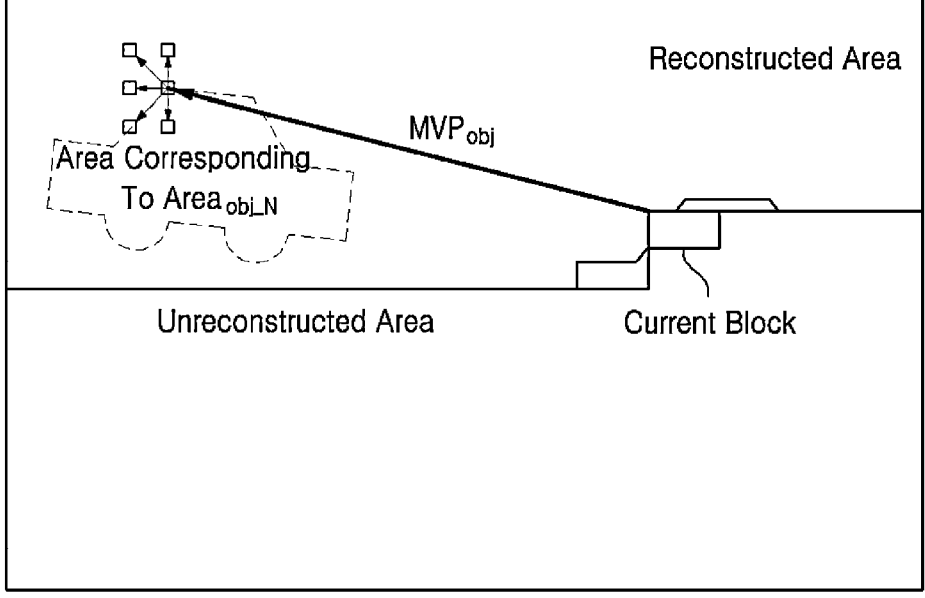
FIG. 13 is a diagram illustrating the derivation of object corresponding position candidates, according to another embodiment of the present disclosure.

As yet another embodiment, if there is no matching area based on an object with the same index or a large motion object in Step S910, the candidate list composer 710 may derive the object corresponding position candidates by utilizing the difference between the position of the top left pixel in the area of Area$_{obj\_N}$ and the position of the top-left pixel of the current block, as illustrated in FIG. 13. Alternatively, neighboring pixels at positions ±c in the x-axis and/or ±d in the y-axis relative to the top left pixel may be utilized in place of the top left pixel of the area of Area$_{obj\_N}$. In the example of FIG. 13, the area of Area$_{obj\_N}$ present in the reference picture is shown as a dashed line in the current picture for convenience.

Figure 14:
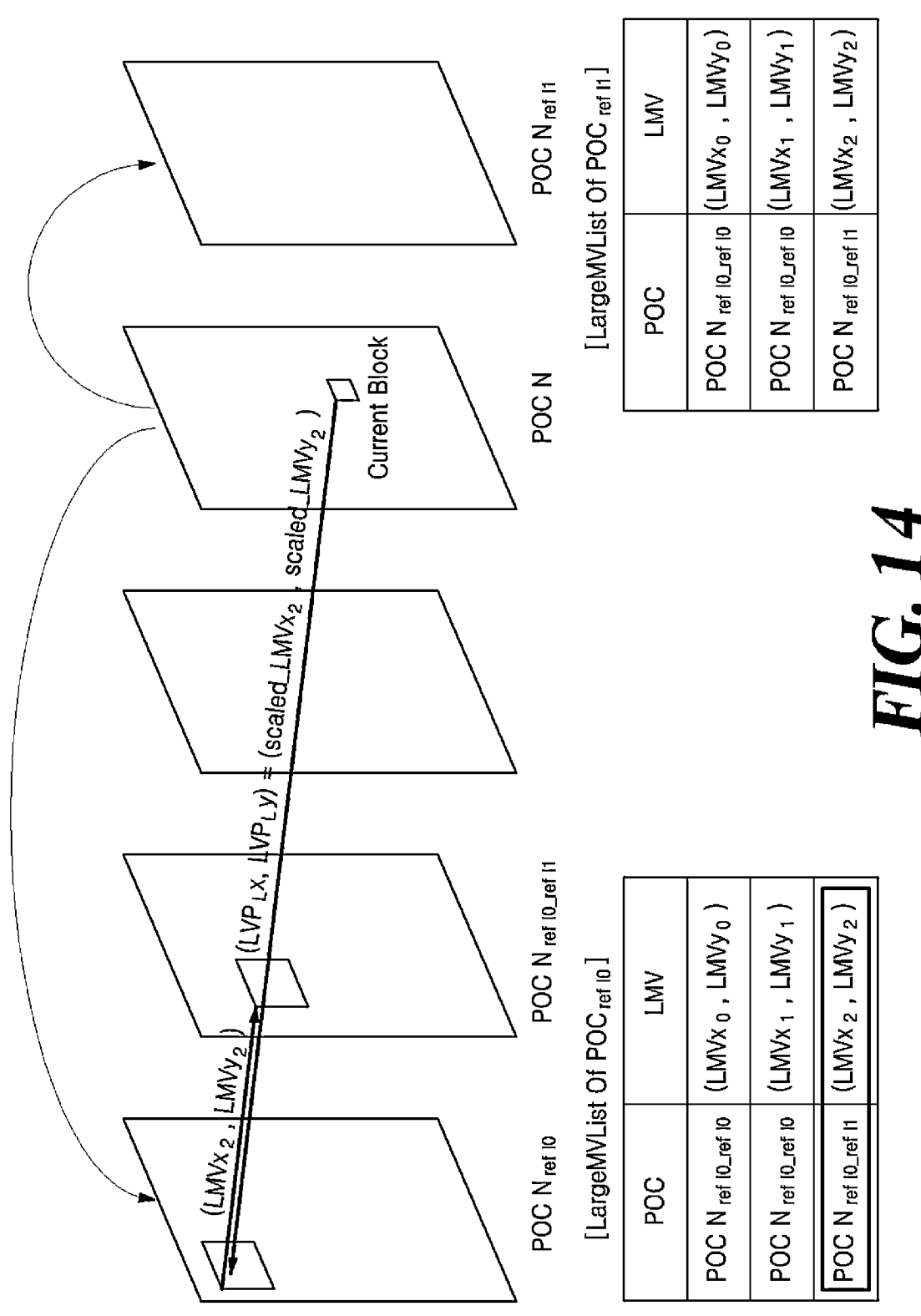
FIG. 14 is a diagram illustrating the derivation of large motion candidates, according to at least one embodiment of the present disclosure.

FIG. 14 is a diagram illustrating the derivation of large motion candidates, according to at least one embodiment of the present disclosure.

This embodiment parses the flag indicating whether the slice (or, tile) containing the current block uses a large motion candidate. In terms of optimizing coding efficiency, the video encoding device may determine such a flag and signal the flag to the video decoding device. If the parsed flag is true, indicating that the slice uses a large motion candidate, the candidate list composer 710 may include the large motion candidate in the candidate list of the current block.

The candidate list composer 710 utilizes the large motion vector list of LargeMVList of the reference picture of the current block to derive the large motion candidates. As illustrated in FIG. 14, the large motion vector list of the reference picture POC N$_{ref1\alpha}$ (where α is 0 or 1) may include one or more pairs of large motion vectors LMV (LMVx$_n$, LMVy$_n$) and a Picture Order Count (POC). Here, POC represents the POC of the reference picture referenced using the large motion vector of the reference picture. The large motion vector list may be stored in the same or a different memory than the memory in which the decoded picture is stored. To derive large motion candidates MVP$_L$s (MVP$_L$x, MVP$_L$y) by using the large motion vectors, the candidate list composer 710 derives a scaling parameter of 'ScalePOC' and a sign parameter of 'sign', as shown in Equation 1 and Equation 2.

$$ScalePOC = \frac{|N - N_{refl\alpha}|}{|N_{refl\alpha\_refl\beta} - N_{refl\alpha}|} \qquad \text{[Equation 1]}$$

$$\text{sign} = ((N_{refl\alpha} - N_{refl\alpha\_refl\beta}) \times (N_{refl\alpha} - N) > 0)?1: -1 \qquad \text{[Equation 2]}$$

Here, the numerator of the scaling parameter represents the absolute value of the difference between the POC of the current picture and the POC of the reference picture of the current block, and the denominator represents the absolute value of the difference between the POC of the reference picture of the current block and the POC (N$_{refl\alpha\_refl\beta}$, where β is 0 or 1) of the reference picture referenced by the selected large motion vector. The sign parameter may be set to −1 if the POC of the current picture and the POC (N$_{refl\alpha\_refl\beta}$) of the reference picture referenced by the large motion vector are both greater than or both less than the POC of the reference picture of the current block, otherwise it may be set to 1.

The candidate list composer 710 may then multiply the scaling parameter and the sign parameter by the large motion vector to derive large motion candidates, as shown in Equation 3 and Equation 4.

$$MVP_L x = \text{scaled\_LMVx}_n = LMVx_n \times \text{sign} \times ScalePOC \qquad \text{[Equation 3]}$$

$$MVP_L y = \text{scaled\_LMVy}_n = LMVy_n \times \text{sign} \times ScalePOC \qquad \text{[Equation 4]}$$

Figure 15:
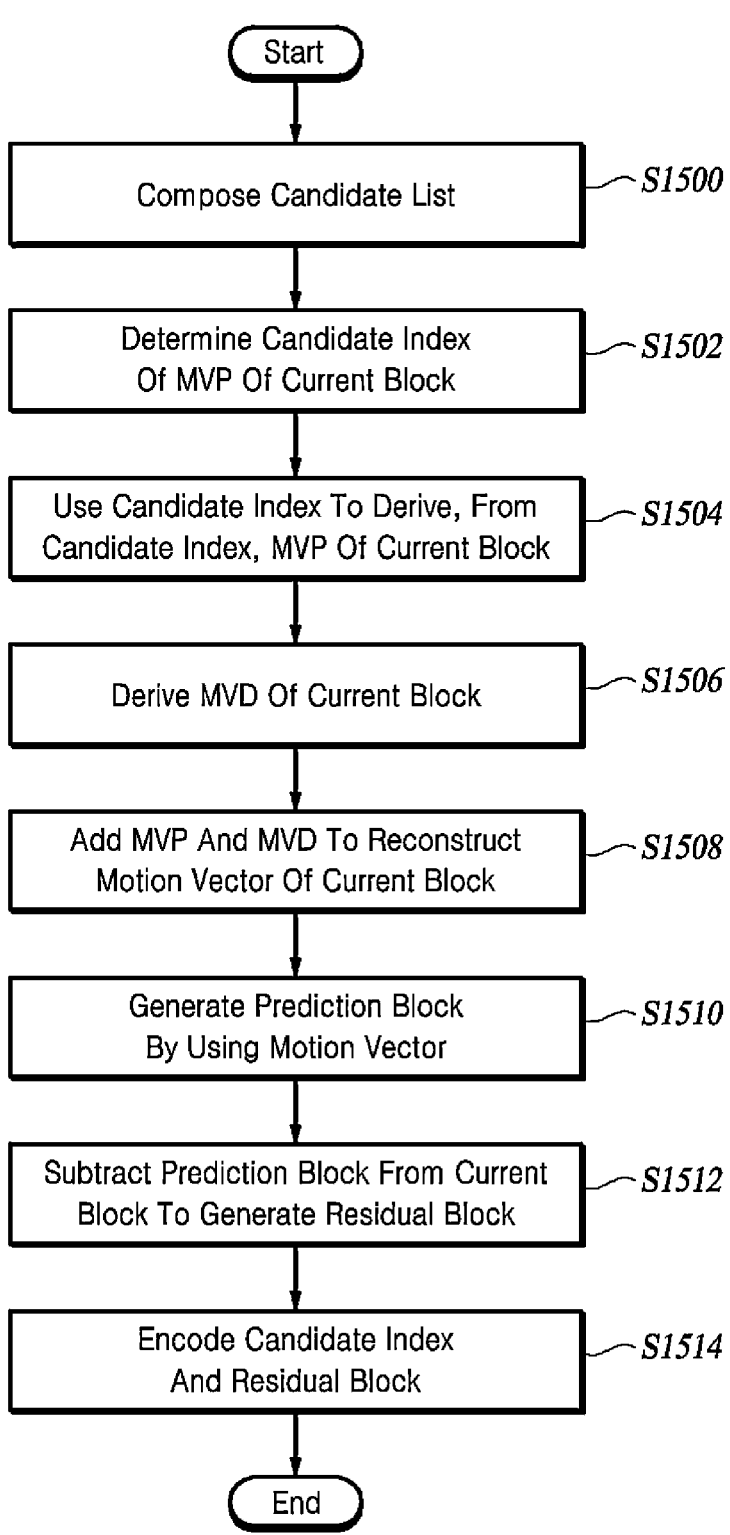
FIG. 15 is a flowchart of a video encoding method using a candidate list of motion vector predictors (MVPs), according to at least one embodiment of the present disclosure.
Figure 16:
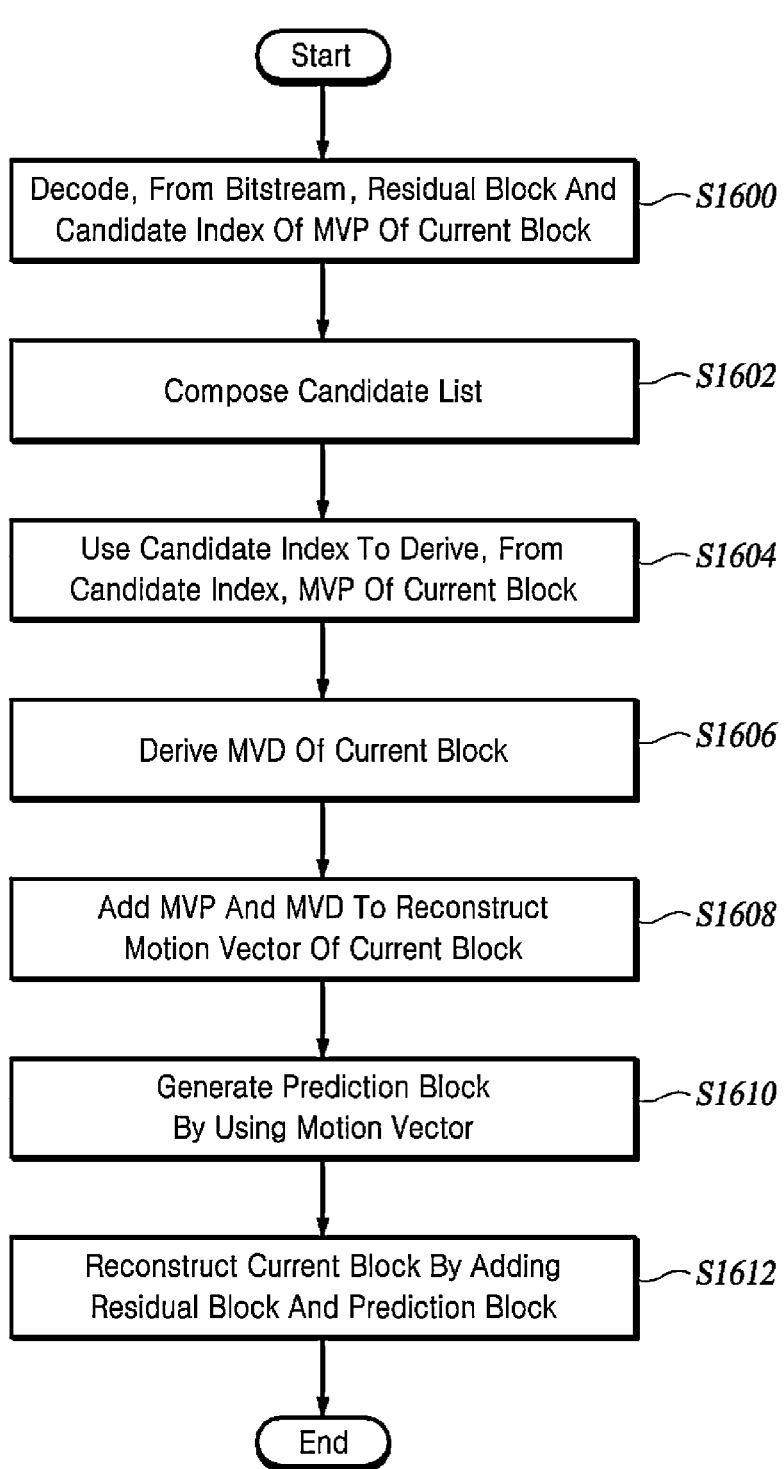
FIG. 16 is a flowchart of a video decoding method utilizing a candidate list of MVPs, according to at least one embodiment of the present disclosure.

Referring now to FIGS. 15 and 16, a video encoding method and a video decoding method utilizing a candidate list of MVPs are described.

FIG. 15 is a flowchart of a video encoding method using a candidate list of MVPs according to at least one embodiment of the present disclosure.

A video encoding device composes a candidate list for the current block (S1500).

The video encoding device composes the candidate list by searching for spatial candidates, temporal candidates, and history-based candidates. The video encoding device may also search for object corresponding position candidates and may add the object corresponding position candidates to the candidate list. The object corresponding position candidates may be searched by using Steps S900 through S912 as described above. In addition, the video encoding device may search for large motion candidates and may add the large motion candidates to the candidate list.

The video encoding device determines a candidate index of the MVP of the current block (S1502). The candidate index indicates one of the MVP candidates in the candidate list. The candidate list may include all or one or more of spatial candidates, temporal candidates, history-based candidates, object corresponding position candidates, or large motion candidates. Further, the MVP candidate indicated by the candidate index may include an index of the reference picture.

The video encoding device uses the candidate index to derive the MVP of the current block from the candidate list (S1504).

The video encoding device derives the MVD of the current block (S1506).

As in AMVP mode, the video encoding device may determine the MVD and may signal the MVD to the video decoding device. Alternatively, as in MMVD techniques, the video encoding device may determine information for deriving the MVD and may derive the MVD from the information. The video encoding device may signal the information for deriving the MVD to the video decoding device.

The video encoding device adds up the MVP and the MVD to reconstruct the motion vector of the current block (S1508).

The video encoding device uses the motion vector to generate a prediction block (S1510). Using the motion vector, the prediction block may be generated from the reference picture indicated by the reference picture index.

The video encoding device subtracts the prediction block from the current block to generate a residual block (S1512).

The video encoding device encodes the candidate index and the residual block (S1514).

FIG. 16 is a flowchart of a video decoding method utilizing a candidate list of MVPs, according to at least one embodiment of the present disclosure.

The video decoding device decodes from the bitstream a candidate index of an MVP of the current block, and a residual block (S1600). Here, the candidate index indicates a candidate of one of the MVP candidates in the candidate list. The candidate list may include all or one or more of spatial candidates, temporal candidates, history-based candidates, object corresponding position candidates, or large motion candidates. The MVP candidates indicated by the candidate index may include an index of the reference picture.

The video decoding device composes the candidate list (S1602).

The video decoding device composes the candidate list by searching for spatial candidates, temporal candidates, and history-based candidates. The video decoding device may also search for object corresponding position candidates to add object corresponding position candidates to the candidate list. The object corresponding position candidates may be searched by using Steps S900 through S912 as described above. Additionally, the video decoding device may search for large motion candidates and may add the large motion candidates to the candidate list.

The video decoding device uses the candidate index to derive the MVP of the current block from the candidate list (S1604).

The video decoding device derives the MVD of the current block (S1606).

As in AMVP mode, the video decoding device may decode the MVD determined by the video encoding device. Alternatively, as in MMVD techniques, the video decoding device may decode information for deriving the MVD and derive the MVD from the decoded information.

The video decoding device adds up the MVP and the MVD to reconstruct the motion vector of the current block (S1608).

The video decoding device uses the motion vector to generate a prediction block (S1610). Using the motion vector, the prediction block may be generated from a reference picture indicated by the reference picture index.

The video decoding device adds the residual block and the prediction block to reconstruct the current block (S1612).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

REFERENCE NUMERALS

124: inter predictor
544: inter predictor
610: motion vector deriver
620: prediction performer
630: prediction weighted-summer

What is claimed is:

1. A method of decoding a motion vector of a current block by a video decoding device, the method comprising:
decoding, from a bitstream, a candidate index of a motion vector predictor of the current block, wherein the candidate index indicates one of motion vector predictors in a candidate list that includes all or one or more of spatial candidates, temporal candidates, history-based candidates, object corresponding position candidates, or large motion candidates;
composing the candidate list; and
deriving the motion vector predictor of the current block from the candidate list by using the candidate index,
wherein composing the candidate list includes deriving the object corresponding position candidates, and
wherein deriving the object corresponding position candidates includes:
decoding an object index of the current block and a reference picture index of the current block, the object index being an index of an object containing the current block, and the reference picture index indicating a reference picture of the current block;

performing a segmentation on the reference picture to identify objects in the reference picture;

selecting, from the identified objects, an object having an index equal to the object index;

searching, in a search area containing the selected object, for an area having a minimum difference from a reconstructed area neighboring the current block;

selecting a matching area that matches the current block, based on the area having the minimum difference; and generating the object corresponding position candidates based on a location within the reference picture of the matching area and a location within a current picture of the current block.

2. The method of claim 1, further comprising:

deriving a motion vector difference of the current block; and reconstructing the motion vector by adding the motion vector predictor and the motion vector difference.

3. The method of claim 1, wherein composing the candidate list further includes:

searching for the spatial candidates;

searching for the temporal candidates; and searching for the history-based candidates.

4. The method of claim 1, wherein composing the candidate list further includes:

decoding a flag indicating the object corresponding position candidates are to be used, wherein, when the flag is true, deriving the object corresponding position candidates is performed.

5. The method of claim 1, wherein generating the object corresponding position candidates includes:

selecting, as one of the object corresponding position candidates, a vector having, as an endpoint, a top left pixel of the matching area or a neighboring pixel of the top left pixel and, as a starting point, a top left pixel of the current block.

6. The method of claim 1, wherein generating the object corresponding position candidates includes:

when the matching area is not present, selecting, as one of the object corresponding position candidates, a vector having, as an endpoint, a top left pixel of the selected object or a neighboring pixel of the top left pixel and, as a starting point, a top left pixel of the current block.

7. The method of claim 1, wherein composing the candidate list further comprises:

deriving a large motion candidate by using a large motion vector list of a reference picture of the current block.

8. The method of claim 7, wherein the large motion vector list includes:

at least one or more pairs of a large motion vector and a picture order count (POC) that indicates a POC of a reference picture referenced by using a large motion vector of the reference picture.

9. The method of claim 8, wherein deriving the large motion candidate includes:

using the POC, a POC of a current picture containing the current block, and the POC of the reference picture to generate the large motion candidate from the large motion vector.

10. A method of encoding a motion vector of a current block by a video encoding device, the method comprising:

composing a candidate list of motion vector predictor candidates of a motion vector predictor of the current block;

determining a candidate index of the motion vector predictor of the current block, wherein the candidate index indicates one of the motion vector predictor candidates in the candidate list that includes all or one or more of spatial candidates, temporal candidates, history-based candidates, object corresponding position candidates, or large motion candidates; and deriving the motion vector predictor of the current block from the candidate list by using the candidate index, wherein composing the candidate list includes deriving the object corresponding position candidates, and wherein deriving the object corresponding position candidates includes:

decoding an object index of the current block and a reference picture index of the current block, the object index being an index of an object containing the current block, and the reference picture index indicating a reference picture of the current block;

performing a segmentation on the reference picture to identify objects in the reference picture;

selecting, from the identified objects, an object having an index equal to the object index;

searching, in a search area containing the selected object, for an area having a minimum difference from a reconstructed area neighboring the current block;

selecting a matching area, that matches the current block, based on the area having the minimum difference; and generating the object corresponding position candidates based on a location within the reference picture of the matching area and a location within a current picture of the current block.

11. The method of claim 10, further comprising:

determining the motion vector of the current block;

deriving a motion vector difference of the current block by using the motion vector of the current block and the motion vector predictor;

reconstructing the motion vector by adding the motion vector predictor and the motion vector difference; and encoding the candidate index.

12. A method for providing a video decoding apparatus with video data, the method comprising:

encoding the video data into a bitstream; and transmitting the bitstream to the video decoding device, wherein encoding the video data comprises:

composing a candidate list of motion vector predictor candidates of a motion vector predictor of a current block;

determining a candidate index of the motion vector predictor of the current block, wherein the candidate index indicates one of the motion vector predictor candidates in the candidate list that includes all or one or more of spatial candidates, temporal candidates, history-based candidates, object corresponding position candidates, or large motion candidates; and deriving the motion vector predictor of the current block from the candidate list by using the candidate index, wherein composing the candidate list includes deriving the object corresponding position candidates, and wherein deriving the object corresponding position candidates includes:

decoding an object index of the current block and a reference picture index of the current block, the object index being an index of an object containing the current block, and the reference picture index indicating a reference picture of the current block;

performing a segmentation on the reference picture to identify objects in the reference picture;

selecting, from the identified objects, an object having an index equal to the object index;

searching, in a search area containing the selected object, for an area having a minimum difference from a reconstructed area neighboring the current block;

selecting a matching area, that matches the current block, based on the area having the minimum difference; and generating the object corresponding position candidates based on a location within the reference picture of the matching area and a location within a current picture of the current block.

\* \* \* \* \*